United States Patent
Orban et al.

(10) Patent No.: US 11,575,533 B2
(45) Date of Patent: Feb. 7, 2023

(54) AUTOMATED LIFECYCLE MANAGEMENT WITH FLEXIBLE SCALING AND DYNAMIC RESOURCE ALLOCATION FOR VIRTUALIZED CABLE DATA PLANE APPLICATIONS

(71) Applicant: ARRIS Enterprises LLC, Suwanee, GA (US)

(72) Inventors: Mircea Orban, Toronto (CA); David E. Virag, Johns Creek, GA (US); Santhana Chari, Johns Creek, GA (US)

(73) Assignee: ARRIS Enterprises LLC, Suwanee, GA (US)

( * ) Notice: Subject to any disclaimer, the term of this patent is extended or adjusted under 35 U.S.C. 154(b) by 158 days.

(21) Appl. No.: 16/953,850

(22) Filed: Nov. 20, 2020

(65) Prior Publication Data
US 2021/0160090 A1 May 27, 2021

Related U.S. Application Data

(60) Provisional application No. 62/939,832, filed on Nov. 25, 2019.

(51) Int. Cl.
*H04L 12/28* (2006.01)
*H04N 21/61* (2011.01)
(Continued)

(52) U.S. Cl.
CPC .......... *H04L 12/2801* (2013.01); *H04L 12/28* (2013.01); *H04L 12/281* (2013.01);
(Continued)

(58) Field of Classification Search
CPC ... H04L 12/2801; H04L 12/28; H04L 12/281; H04L 47/781; H04L 47/782; H04L 12/2898; H04L 41/0806; H04L 41/0893; H04L 41/0895; H04L 49/70; H04N 21/6118; H04N 21/6168; H04N 7/102; H04W 72/04
See application file for complete search history.

(56) References Cited

U.S. PATENT DOCUMENTS 10,498,611 B1 * 12/2019 Kloberdans ......... H04L 12/4675
2014/0122695 A1 * 5/2014 Kulikov .............. H04L 41/0896
709/224

(Continued)

OTHER PUBLICATIONS

PCT Search Report & Written Opinion, Re: Application No. PCT/US2020/061468, dated Mar. 15, 2021.

(Continued)

*Primary Examiner* — Patrice L Winder
(74) *Attorney, Agent, or Firm* — Chernoff, Vilhauer, McClung & Stenzel, LLP (57) ABSTRACT

Systems and methods to support flexible scaling and dynamic resource allocation for virtualized cable data plane applications. The system includes a head end together with a node to provide data to customer devices. A container operating that includes a data plane application that provides packets of data for transmission to the node. The data plane application is instantiated with at least one of a virtual networking function and a computing resource function.

15 Claims, 7 Drawing Sheets

(51) Int. Cl.
*H04L 47/78* (2022.01)
*H04W 72/04* (2009.01)

(52) U.S. Cl.
CPC .......... *H04L 47/781* (2013.01); *H04L 47/782* (2013.01); *H04N 21/6118* (2013.01); *H04N 21/6168* (2013.01); *H04W 72/04* (2013.01)

(56) References Cited

U.S. PATENT DOCUMENTS

| | | | | |
|---|---|---|---|---|
| 2015/0092531 | A1* | 4/2015 | Bernstein | G06F 9/45558 370/254 |
| 2016/0328251 | A1* | 11/2016 | Bernstein | G06F 9/45558 |
| 2016/0330138 | A1* | 11/2016 | Thomason | G06F 9/45558 |
| 2017/0244577 | A1 | 8/2017 | Patrick et al. | |
| 2017/0289002 | A1* | 10/2017 | Ganguli | H04L 41/5051 |
| 2019/0238229 | A1* | 8/2019 | Chapman | H04B 10/25753 |
| 2020/0081682 | A1* | 3/2020 | Vestal | H04N 21/2187 |

OTHER PUBLICATIONS

Emmendorfer Michael J: "WBI.2—Cable Operator's Access Architecture from Aggregation to Disaggregation and Distributed (Plenary)", 2019 IEEE Photon I CS Society Summer Topical Meeting Series (SUM), IEEE, Jul. 8, 2019 (Jul. 8, 2019), the whole document.

DVB Organization: "SCTE ARRIS Virtualized CCAP.pdf", DVB, Digital Video Broadcasting, C/O EBU-17A Ancienne Route—CH-1218 Grand Saconnex, Geneva—Switzerland, Oct. 26, 2017 (Oct. 26, 2017), the whole document.

\* cited by examiner

AUTOMATED LIFECYCLE MANAGEMENT WITH FLEXIBLE SCALING AND DYNAMIC RESOURCE ALLOCATION FOR VIRTUALIZED CABLE DATA PLANE APPLICATIONS

CROSS REFERENCE TO RELATED APPLICATIONS

This application claims the benefit of U.S. Provisional Patent Application No. 62/939,832 filed Nov. 25, 2019.

BACKGROUND

The subject matter of this application relates to systems and methods to support lifecycle management for virtualized cable data plane applications.

Cable Television (CATV) services provide content to large groups of customers (e.g., subscribers) from a central delivery unit, generally referred to as a "head end," which distributes channels of content to its customers from this central delivery unit through an access network comprising a hybrid fiber coax (HFC) cable plant, including associated components (nodes, amplifiers and taps). Modern Cable Television (CATV) service networks, however, not only provide media content such as television channels and music channels to a customer, but also provide a host of digital communication services such as Internet Service, Video-on-Demand, telephone service such as VoIP, home automation/security, and so forth. These digital communication services, in turn, require not only communication in a downstream direction from the head end, through the HFC, typically forming a branch network and to a customer, but also require communication in an upstream direction from a customer to the head end typically through the HFC network.

To this end, CATV head ends have historically included a separate Cable Modem Termination System (CMTS), used to provide high speed data services, such as cable Internet, Voice over Internet Protocol, etc. to cable customers and a video headend system, used to provide video services, such as broadcast video and video on demand (VOD). Typically, a CMTS will include both Ethernet interfaces (or other more traditional high-speed data interfaces) as well as radio frequency (RF) interfaces so that traffic coming from the Internet can be routed (or bridged) through the Ethernet interface, through the CMTS, and then onto the RF interfaces that are connected to the cable company's hybrid fiber coax (HFC) system. Downstream traffic is delivered from the CMTS to a cable modem and/or set top box in a customer's home, while upstream traffic is delivered from a cable modem and/or set top box in a customer's home to the CMTS. The Video Headend System similarly provides video to either a set-top, TV with a video decryption card, or other device capable of demodulating and decrypting the incoming encrypted video services. Many modern CATV systems have combined the functionality of the CMTS with the video delivery system (e.g., EdgeQAM—quadrature amplitude modulation) in a single platform generally referred to as a Converged Cable Access Platform (CCAP).

Furthermore, many modern architectures relocate the physical layer (PHY) of a traditional CMTS or CCAP to the network's fiber nodes (referred to as a Remote PHY or R-PHY architecture). Thus, while the core in the CMTS/CCAP performs the higher layer processing, the R-PHY device in the remote node converts the downstream data sent from the core from digital-to-analog to be transmitted on radio frequency to the cable modems and/or set top boxes, and converts the upstream radio frequency data sent from the cable modems and/or set top boxes from analog-to-digital format to be transmitted optically to the core. Still other modern CATV systems relocate the control or MAC layer to the fiber nodes as well (called R-MACPHY architectures) or relocate other components into the nodes. Such architectures are generally referred to as Distributed Access Architectures (DAA), Distributed CMTS (D-CMTS), etc. as opposed to integrated architectures where all physical and control layers are located in the head end (e.g., I-CMTS). For simplicity, though this disclosure will subsequently show and describe an "I-CMTS" architecture as one where all CMTS functionality is located in the head end, those of ordinary skill in the art will understand that in a system containing a CCAP, such a description would include an integrated CCAP architecture where all CCAP functionality is located in the head end. Similarly, though this disclosure will subsequently show and describe a D-CMTS architecture where physical portions of the CMTS are pushed into the nodes, those of ordinary skill in the art will understand that such a description would not only include other distributed architectures such as a R-MACPHY, but also distributed CCAP functionality as well where a system uses a CCAP.

Unfortunately, virtualization of portions of the system tend to be problematic for real-time applications. What is desired, therefore, are improved systems and methods for virtualization of portions of the system.

BRIEF DESCRIPTION OF THE DRAWINGS

For a better understanding of the invention, and to show how the same may be carried into effect, reference will now be made, by way of example, to the accompanying drawings, in which.

DETAILED DESCRIPTION

Figure 1:
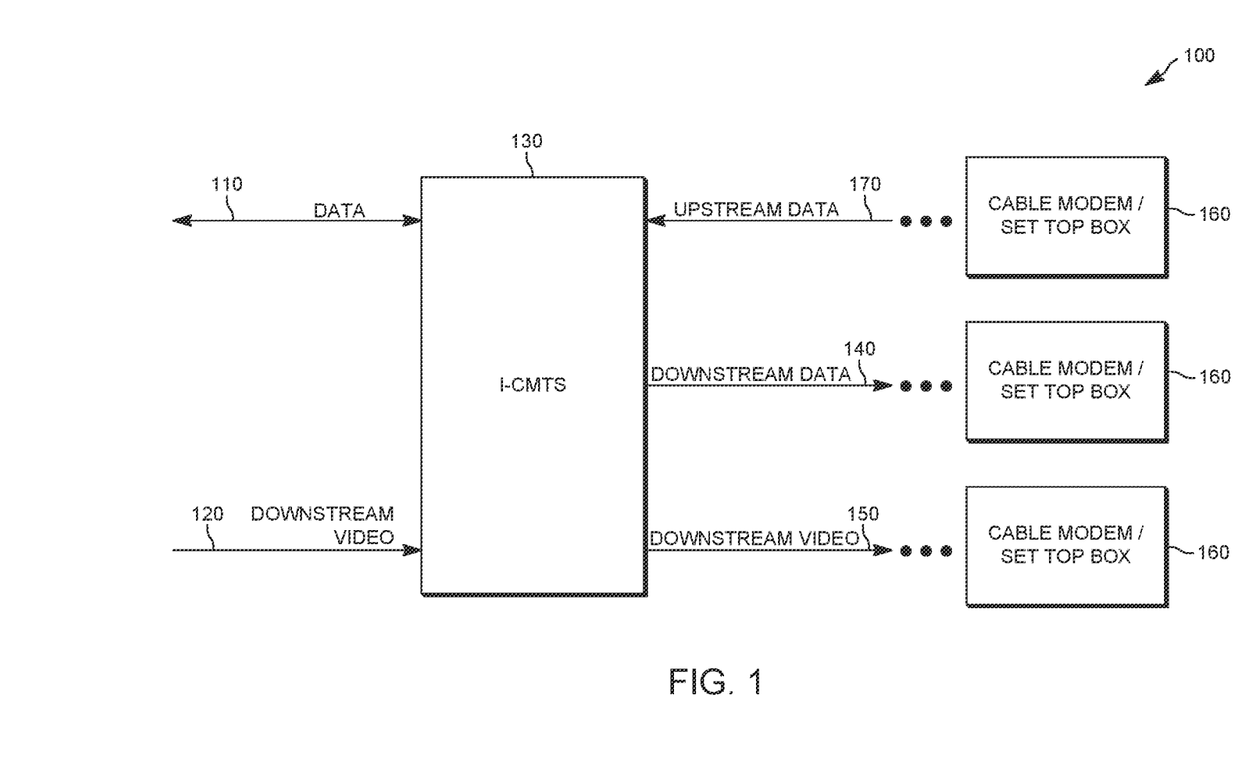
FIG. 1 illustrates an integrated Cable Modem Termination System.

Referring to FIG. 1, an integrated CMTS system 100 may include data 110 that is sent to and received by integrated CMTS 130 (or an integrated CCAP) via the Internet (or other network) typically in the form of packetized data. The integrated CMTS/CCAP 130 may also receive downstream video 120, typically in the form of packetized data from an operator video aggregation system. By way of example, broadcast video is typically obtained from a satellite delivery system and pre-processed for delivery to the subscriber either though a CCAP or a QAM system co-located in a head end with a CMTS. Also, by way of example, Internet based video (e.g., YouTube) is typically delivered through a general Internet data pipe to a CMTS. The integrated CMTS system 100 receives and processes the received data 110 and downstream video 120. The CMTS 130 (or CCAP) unifies the cable modem termination system, switching, routing and QAM functionality at the head end, so that all the data, video, voice functions, etc., may be handled over IP before conversion to RF or optical signals. The CMTS 130 may transmit downstream data 140 and downstream video 150 to a customer's cable modem and/or set top box 160 through a network, which may include other devices, such as amplifiers and splitters. The CMTS 130 may receive upstream data 170 from a customer's cable modem and/or set top box 160 through a network, which may include other devices, such as amplifiers and splitters. The CMTS 130 may include multiple devices to achieve its desired capabilities.

Figure 2:
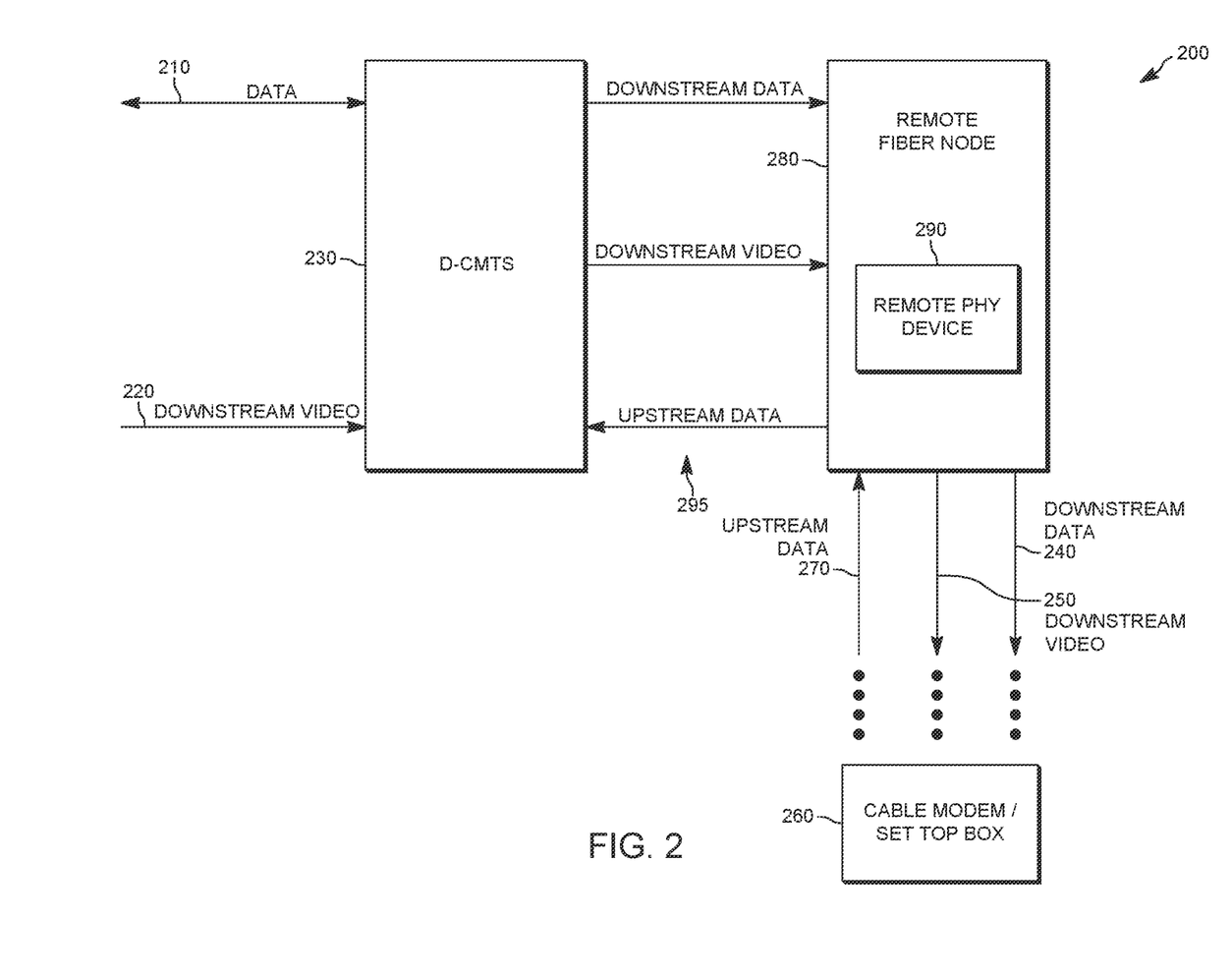
FIG. 2 illustrates a distributed Cable Modem Termination System.

Referring to FIG. 2, as a result of increasing bandwidth demands, limited facility space for integrated CMTSs, and power consumption considerations, it is desirable to include a D-CMTS system 200 (e.g., Distributed Converged Cable Access Platform (CCAP)). The D-CMTS system 200 distributes a portion of the functionality of the I-CMTS system 100 downstream to a remote location, such as a fiber node, using network packetized data. An exemplary D-CMTS system 200 may include a remote PHY architecture, where a remote PHY (R-PHY) is preferably an optical node device that is located at the junction of the fiber and the coaxial. In general, the R-PHY often includes the MAC and PHY layers of a portion of the system. The D-CMTS system 200 may include a D-CMTS core 230 that includes data 210 that is sent and received over the Internet (or other network) typically in the form of packetized data. The D-CMTS core 230 may also receive downstream video 220, typically in the form of packetized data from an operator video aggregation system. The D-CMTS core 230 receives and processes the received data 210 and downstream video 220. A remote Fiber node 280 preferably includes a remote PHY device 290. The remote PHY device 290 may transmit downstream data 240 and downstream video 250 to a customer's cable modem and/or set top box 260 through a network, which may include other devices, such as amplifier and splitters. The remote PHY device 290 may receive upstream data 270 from a customer's cable modem and/or set top box 260 through a network, which may include other devices, such as amplifiers and splitters. The remote PHY device 290 may include multiple devices to achieve its desired capabilities. The remote PHY device 290 primarily includes PHY related circuitry, such as downstream QAM modulators, upstream QAM demodulators, together with psuedowire logic to connect to the D-CMTS 230 using network packetized data. The remote PHY device 290 and the D-CMTS 230 may include data and/or video interconnections, such as downstream data, downstream video, and upstream data 295. It is noted that, in some embodiments, video traffic may go directly to the remote physical device thereby bypassing the RPHY Core. In some cases, the remote PHY and/or remote MAC PHY functionality may be provided at the head end.

By way of example, the remote PHY device 290 may covert downstream DOCSIS (i.e., Data Over Cable Service Interface Specification) data (e.g., DOCSIS 1.0; 1.1; 2.0; 3.0; 3.1; and 4.0 each of which are incorporated herein by reference in their entirety), video data, out of band signals received from the D-CMTS 230 to analog for transmission over RF or linear optics. By way of example, the remote PHY device 290 may convert upstream DOCSIS, and out of band signals received from an analog medium, such as RF or linear optics, to digital for transmission to the D-CMTS 230. As it may be observed, depending on the particular configuration, the R-PHY may move all or a portion of the DOCSIS MAC and/or PHY layers down to the fiber node.

I-CMTS devices are typically custom built hardware devices that consist of a single chassis that include a series of slots, each of which receives a respective line card with a processor, memory, and other computing and networking functions supported thereon. Each of the line cards include the same hardware configuration, processing capabilities, and software. Each of the line cards performs the functions of the I-CMTS device, including the MAC and PHY functionality. As the system increasingly scales to support additional customers, additional line cards are included with the system to expand the processing capability of the system. Unfortunately, it is problematic to dynamically scale the number of line cards in a real-time manner to meet the demands of a particular network.

The computational power of microprocessor based common off the shelf (COTS) server platforms are increasing while the expense of such systems is decreasing over time. With such systems, a computing system may be, if desired, virtualized and operated using one or more COTS server, generally referred to herein as a virtual machine. Using container technologies running on the COTS server and/or virtual machine, the COTS server may operate with only a single operating system. Each of the virtualized applications may then be isolated using software containers, such that the virtualized application may not see and are not aware of other virtualized applications operating on the same machine. Typically, each COTS server includes one or more Intel/AMD processors (or other processing devices) with associated memory and networking capabilities running an operating system software. Typically, the COTS servers include a framework and an operating system where user applications are run on such framework and the operating system is abstracted away from the actual operating system. Each virtual machine may be instantiated and operated as one or more software applications running on a COTS server. A plurality of software containers may be instantiated and operated on the same COTS server and/or the same virtual machine. A plurality of COTS servers are typically included in one or more data centers, each of which are in communication with one another. A plurality of COTS server may be located in different geographic areas to provide geo-redundancy. In some embodiments, the container may include the same functionality as a virtual machine, or vice versa. In some embodiments, a grouping of containerized components, generally referred to as a pod, may be in the form of a virtual machine.

In some embodiments, the COTS servers may be "bare metal" servers that typically include an operating system thereon together with drivers and a portion of a container orchestration system. One or more containers are then added to the "bare metal" server while being managed by the container orchestration system. The container orchestration system described herein may likewise perform as, and be referred to as, a virtual machine orchestration system, as desired. In some embodiments, "bare metal" servers may be used with pods running on the operating system thereon together with drivers and a container orchestration system. In some embodiments, virtual machines may be omitted from the COTS servers.

Selected software processes that are included on a line card and/or a remote PHY device may be run on a "bare metal" server and/or virtual machine, including software containers, running on a COTS server, including both "active" and "back-up" software processes. The functionality provided by such a "bare metal" server and/or virtual machine may include higher level functions such as for example, packet processing that includes routing Internet packet provisioning, layer 2 virtual private networking which operates over pseudowires, and multiprotocol label switching routing. The functionality provided by such a "bare metal" server and/or virtual machine may include DOCSIS functions such as for example, DOCSIS MAC and encapsulation, channel provisioning, service flow management, quality of service and rate limiting, scheduling, and encryption. The functionality provided by such a "bare metal" server and/or virtual machine may include video processing such as for example, EQAM and MPEG processing.

Each of the COTS servers and/or the virtual machines and/or software containers may contain different hardware profiles and/or frameworks. For example, each of the COTS servers and/or "bare metal" servers and/or virtual machines and/or software containers may include different processor types, different number of processing cores per processor, different amounts of memory for each processor type, different amounts of memory per processing core, different cryptographic capabilities, different amounts of available off-processor memory, different memory bandwidth (DDR) speeds, and varying types and capabilities of network interfaces, such as Ethernet cards. In this manner, different COTS servers and/or "bare metal" servers and/or virtual machines and/or software containers may have different processing capabilities that vary depending on the particular hardware. Each of the COTS servers and/or "bare metal" servers and/or the virtual machine and/or software containers may contain different software profiles. For example, each of the COTS servers and/or "bare metal" servers and/or virtual machines and/or software containers may include different software operating systems and/or other services running thereon, generally referred to herein as frameworks. In this manner, different COTS servers and/or "bare metal" servers and/or virtual machines and/or software containers may have different software processing capabilities that vary depending on the particular software profile.

Figure 3:
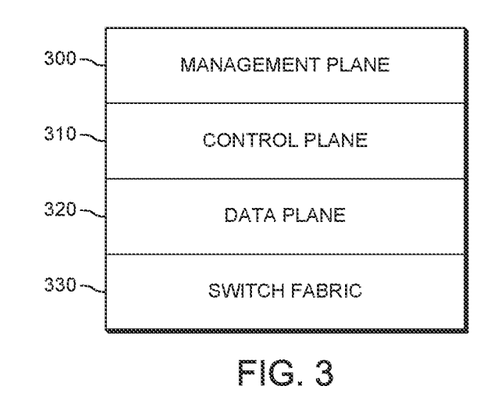
FIG. 3 illustrates a layered network stack.

Referring to FIG. 3, for data processing and for transferring data across a network, the architecture of the hardware and/or software may be configured in the form of a plurality of different planes, each of which performing a different set of functionality. In relevant part the layered architecture may include different planes such as a management plane 300, a control plane 310, a data plane 320, and switch fabric 330 to effectuate sending and receiving packets of data.

For example, the management plane 300 may be generally considered as the user interaction or otherwise the general software application being run. The management plane typically configures, monitors, and provides management, monitoring, and configuration served to all layers of the network stack and other portions of the system.

For example, the control plane 310 is a component to a switching function that often includes system configuration, management, and exchange of routing table information and forwarding information. Typically, the exchange of routing table information is performed relatively infrequently. A route controller of the control plane 310 exchanges topology information with other switches and constructs a routing table based upon a routing protocol. The control plane may also create a forwarding table for a forwarding engine. In general, the control plane may be thought of as the layer that makes decisions about where traffic is sent. Since the control functions are not performed on each arriving individual packet, they tend not to have a strict speed constraint.

For example, the data plane 320 parses packet headers for switching, manages quality of service, filtering, medium access control, encapsulations, and/or queuing. As a general matter, the data plane carriers the data traffic, which may be substantial in the case of cable distribution networks. In general, the data plane may be thought of as the layer that primarily forwards traffic to the next hop along the path to the selected destination according to the control plane logic through the switch fabric. The data plane tends to have strict speed constraints since it is performing functions on each arriving individual packet.

For example, the switch fabric 330 provides a network topology to interconnect network nodes via one or more network switches.

As the system increasingly scales to support additional customers, additional COTS servers and/or "bare metal" servers and/or virtual machines and/or software containers are included with the system to expand the processing capability of the overall system. To provide processing redundancy, one or more additional COTS servers and/or "bare metal" servers and/or virtual machines and/or software containers may be included that are assigned as "back-up" which are exchanged for an "active" process upon detection of a failure event. The scaling of the data plane 320 on COTS servers and/or "bare metal" servers and/or virtual machines and/or software containers to service dynamically variable processing requirements should be performed in such a manner that ensures sufficiently fast processing of data packets and sufficient bandwidth for the transmission of the data packets to ensure they are not otherwise lost.

It is desirable to virtualize the data plane, and in particular all or a portion of the Remote PHY functionality on a COTS server and/or "bare metal" servers. In this manner, the MAC cores for the cable distribution system may run on COTS servers and/or "bare metal" servers. By way of reference herein, a virtualized Remote PHY MAC Core may be referred to herein as a vCore instance.

Figure 4:
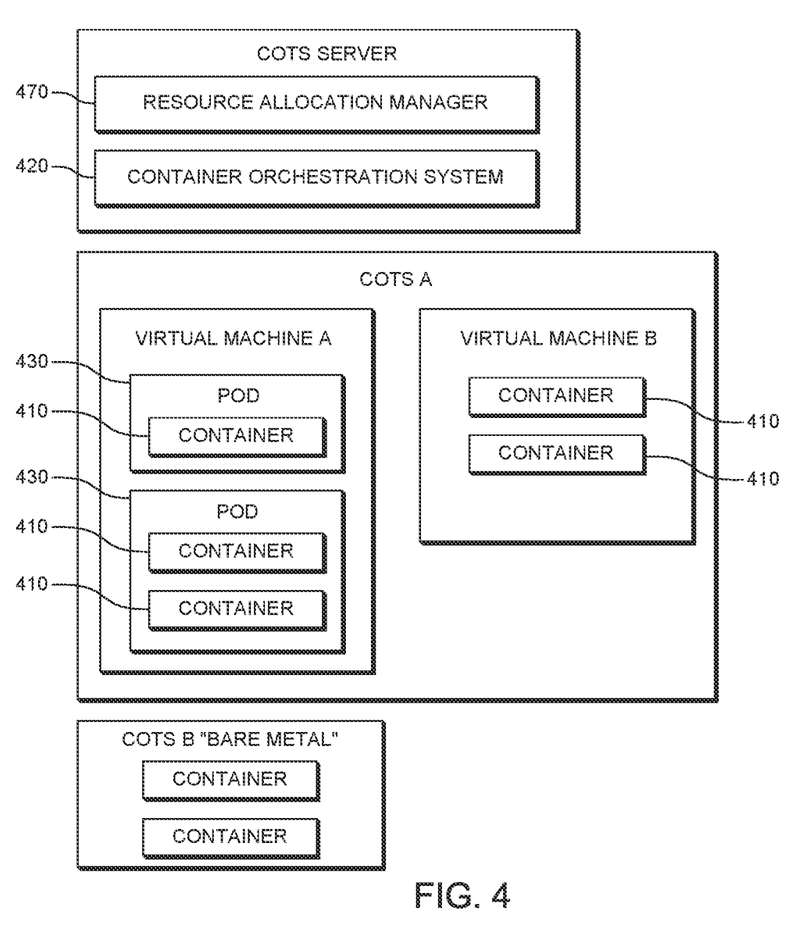
FIG. 4 illustrates a server system with a resource allocation manager and a container orchestration system.

Referring to FIG. 4, it is desirable to incorporate platform as a service that uses operating system level virtualization to deliver software in packages, generally referred to as containers 410. Each of the containers are isolated from one another and bundle their own software, libraries, and configuration files. The containers may communicate with one another using defined channels. As a general matter, one or more applications and its dependencies may be packed in a virtual container that can run on a COTS server and/or "bare metal" server and/or a virtual machine. This containerization increases the flexibility and portability on where the application may run, such as an on-premises COTS server, a "bare metal" server, a public cloud COTS server, a private cloud COTS server, or otherwise. With each container being relatively lightweight, a single COTS server and/or "bare metal" server and/or a virtual machine operating on a COTS server and/or "bare metal" server may run several containers simultaneously. In addition, the COTS server and/or "bare metal" server and/or the virtual machine and/or the containers may be distributed within the cable distribution system.

A COTS server and/or "bare metal" server and/or a virtual machine may include a container orchestration system 420 for automating the application deployment, scaling, and management of the containers 410 across one or more COTS servers and/or "bare metal" servers and/or virtual machines. Preferably the computing device running the container orchestration system 420 is separate from the computing device providing the containers for the dataplane applications. It is to be understood that the virtual machine illustrated in FIG. 4 may be omitted, such as the COTS B. The application deployment, scaling, and management of the containers may include clusters across multiple hosts, such as multiple COTS servers. The deployment, maintaining, and scaling, of the containers may be based upon characteristics of the underlying system capabilities, such as different processor types, different number of processing cores per processor, different amounts of memory for each processor type, different amounts of memory per processing core, different amounts of available off-processor memory, different memory bandwidth (DDR) speeds, different frameworks, and/or varying types and capabilities of network interfaces, such as Ethernet cards. Moreover, the container orchestration system 420 may allocate different amounts of the underlying system capabilities, such as particular processor types, a selected number of processors (e.g., 1 or more), a particular number of processing cores per selected processor, a selected amount of memory for each processor type, a selected amount of memory per processing core, a selected amount of available off-processor memory, a selected framework, and/or a selected amount and/or type of network interface(s), such as Ethernet cards. A corresponding agent for the container orchestration system 420 may be included on each COTS server (e.g., COTS A and/or COTS B).

The container orchestration system 420 may include a grouping of containerized components, generally referred to as a pod 430. A pod consists of one or more containers that are co-located on the same COTS server and/or "bare metal" server and/or the same virtual machine, which can share resources of the same COTS server and/or "bare metal" server and/or same virtual machine. Each pod 430 is preferably assigned a unique pod IP address within a cluster, which allows applications to use ports without the risk of conflicts. Within the pod 430, each of the containers may reference each other based upon a localhost or other addressing service, but a container within one pod preferably has no way of directly addressing another container within another pod, for that, it preferably uses the pod IP address or otherwise an addressing service.

A traditional D-CMTS RPHY Core may be implemented as a speciality built appliance including both software and hardware to achieve desired performance characteristics, such as ensuring the timing of the transfer of data packets. The speciality built appliance is not amenable to automatic deployment nor automatic scaling due to the fixed nature of its characteristics. In contrast to a speciality built appliance, the vCore instance is preferably implemented in software operating on a COTS server and/or "bare metal" server on top of an operating system, such as Linux. The vCore instance is preferably implemented in a manner that readily facilitates automation techniques such as lifecycle management, flexible scaling, health monitoring, telemetry, etc. Unfortunately, running a vCore instance on a COTS server and/or "bare metal" server tends to result in several challenges, mostly related to the data plane components. One of the principal challenges involves ensuring that data is provided to the network in a timely and effective manner to achieve the real time characteristics of a cable data distribution environment. The cable data distribution environment includes real time constraints on the timing of data packet delivery, which is not present in typical web based environments or database environments.

Each vCore instance is preferably implemented within a container, where the size (e.g., scale) of each container translates into the amount of server hardware and software resources assigned to the particular vCore instance. The amount of server hardware and software resources assigned to each particular vCore instance is preferably a function of the number of groups of customers (e.g., service groups) and/or number of customers that the vCore instance can readily provide RPHY MAC Core services to. For example, a limited amount of server hardware and software resources may be assigned to a particular vCore instance that has a limited number of groups of customers and/or customers. For example, a substantial amount of server hardware and software resources may be assigned to a particular vCore instance that has a substantial number of groups of customers and/or customers. For example, selected server hardware resources are preferably allocated among the different vCore instances in a non-overlapping manner so that each vCore instance has a dedicated and predictable amount of server hardware resources. For example, selected software resources are preferably allocated among the different vCore instances in a non-overlapping manner so that each vCore instance has a dedicated and predictable amount of software resources.

For example, the number of CPU cores preferably assigned to each vCore instance (Cc) may be a function of the total USSG (upstream service groups—groups of customer modems and/or set top boxes) (USsg) and the total DSSG (downstream service groups—groups of customer modems and/or set top boxes) (DSsg) connected through that vCore instance. This may be represented as vCore: $Cc=f_1$ (USsg, DSsg). Other hardware and/or software characteristics may likewise be assigned, as desired.

For example, the network capacity assigned to each vCore instance (Cbw) may be a function of the of the total USSG (upstream service groups—groups of customer modems and/or set top boxes) (USsg) and the total DSSG (downstream service groups—groups of customer modems and/or set top boxes) (DSsg) connected to that vCore instance. This may be represented as $Cbw=f_2$ (USsg, DSsg). Other hardware and/or software characteristics may likewise be assigned, as desired.

The scaling of the vCore instance may refer to the capability to automatically create and deploy a vCore instance within a container on a COTS server and/or "bare metal" server and/or virtual machine that is appropriately sized to serve a particular set of remote physical devices and/or service groups (e.g., sets of cable customers) and/or cable customers. The scaling of the vCore instance may also include, in some cases, the capability to automatically modify the hardware and/or software characteristics of an existing vCore instance within a container on a COTS server and/or "bare metal" server and/or virtual machine to be appropriately sized to serve a modified particular set of remote physical devices and/or service groups (e.g., sets of cable customers) and/or cable customers.

A resource allocation manager 470 may assign or reallocate a suitable amount of hardware and software of the COTS server and/or "bare metal" server resources to each particular vCore instance (e.g., CPU cores, and/or memory, and/or network capacity). The amount of such COTS server and/or "bare metal" server hardware and software resources assigned to or reallocate to each vCore instance may be a function of its scale and also other features, such as various other resource allocations. A corresponding agent for the resource allocation manager 470 may be included on each COTS server (e.g., COTS A, COTS B).

The vCore instance includes data plane software for the transfer of data packets and other functions of the data plane. The data plane software may include a set of data plane libraries and network interface controller (NIC) drivers that are used to manage the data packets for the data plane. Preferably, the data plane software operates in user space, as opposed to Kernel space like typical network processing software, thus it does not make use of the operating system kernel and container management network drivers and plugins. For example, the data plane software may include a queue manager, a buffer manager, a memory manager, and/or a packet framework for packet processing. The data plane software may use CPU cores that are isolated from the Kernel, meaning that the operating system scheduled processes are not running on these isolated CPU cores. The separation of the CPU cores between the data plane software and the operating system software ensures that tasks performed by the operating system software does not interfere with the data plane software processing the data packets in a timely manner. In addition, the separation of the CPU cores between the data plane software and the operating system software enables both to use the same physical central processing unit, albeit different cores, of the same physical central processing unit. In addition, other hardware and/or software capabilities may likewise be separated, such as for example, selected processors (e.g., 1 or more), particular number of processing cores per selected processor, selected amount of memory for each processor type, selected amount of memory per processing core, selected amount of available off-processor memory, selected framework, and/or selected amount and/or type of network interface(s).

It is also desirable for each vCore instance to have dedicated network bandwidth capability apart from other vCore instances and the operating system software. To provide dedicated network bandwidth for a vCore instance, the physical network interface cards may be virtualized so that a plurality of different software applications can make use of the same network interface card, each with a guaranteed amount of bandwidth available. The network interface cards are preferably virtualized using a single root input/output virtualization technique (SR-IOV). The SR-IOV partitions the NIC physical functions (e.g., PFs) into one or more virtual functions (VFs). The capabilities of the PFs and VFs are generally different. In general, the PF supports queues, descriptions, offloads, hardware lock, hardware link control, etc. In general, the VF supports networking features based upon queues and descriptors.

The automated creation, deployment, and removal of vCore instances may be performed by the container orchestration system 420.

Figure 5:
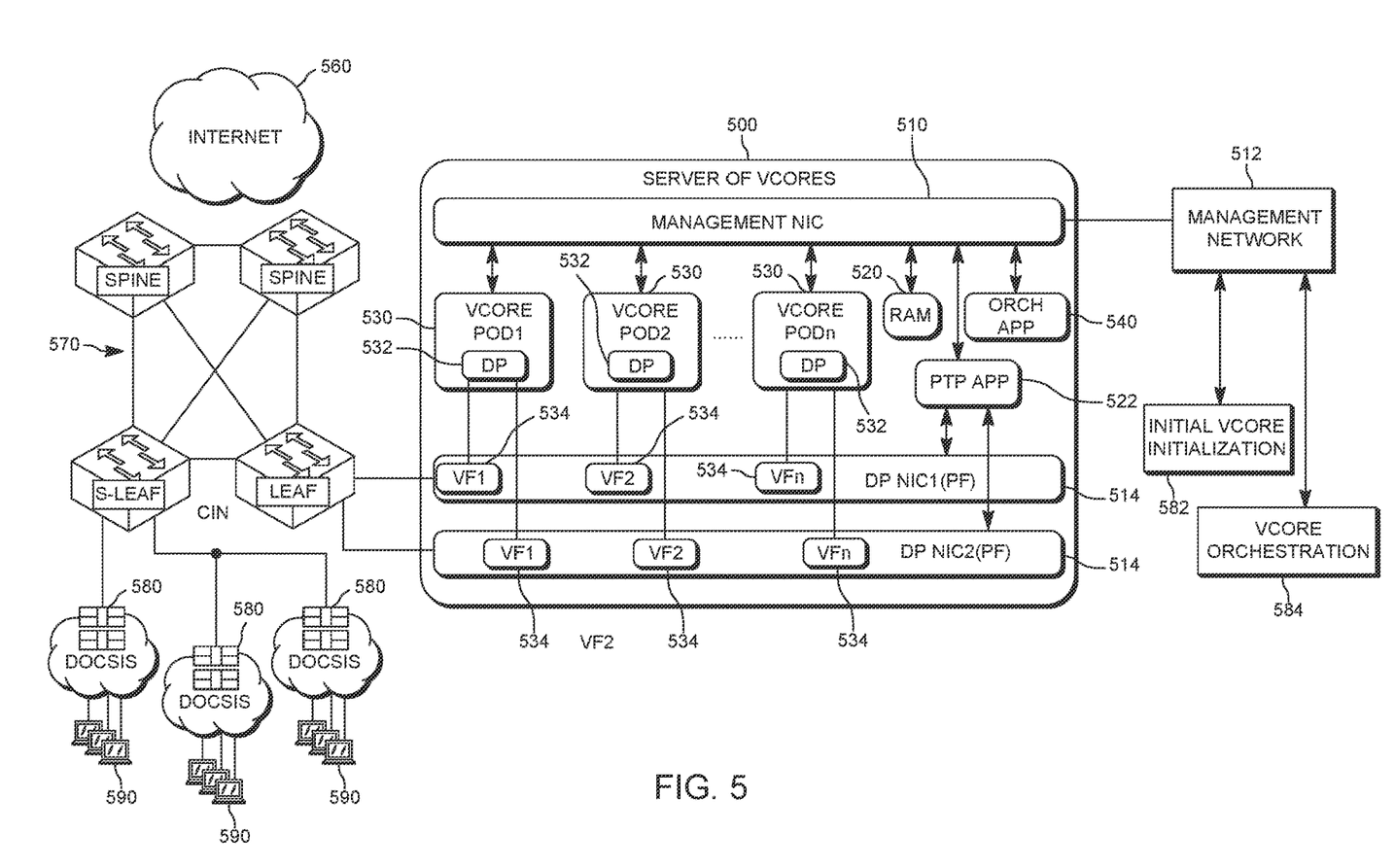
FIG. 5 illustrates a server system with containers and a container orchestration system.

Referring to FIG. 5, the vCore instances 530 may operate on a COTS server and/or "bare metal" server 500 acting as a remote PHY MAC core for one or more remote physical devices connected over a converged interconnect network, normally located in the same hub. The vCore instances 530 may include data plane software 532. Each of the vCore instances 530 may be a group of vCore instances, if desired, generally referred to as a POD. The COTS server 500 may communicate with the Internet 560, a set of networking switches 570, to remote physical devices 580, and the customers 590. The COTS server and/or "bare metal" server including the vCore instances operating thereon is typically a relatively high performance server that has one or more of the following characteristics:

Hardware:
At least one management NIC 510 is connected to, usually, a separate management network 512. The management NIC 510 is primarily used for orchestration and management of data traffic.

Preferably at least two (for redundancy) data plane NICs 514 (i.e., data plane physical network interfaces) together with SR-IOV and PTP (IEEE 1588) 522 are included for hardware timestamping capabilities of the data packets. The data plane NICs 514 are used to provide connectivity to the remote physical devices and the customer modems and/or set top boxes/consumer premises equipment behind such remote physical devices. The vCore instances 530 may each include a virtual function 534 network interface to each of the data plane NICs 514.

In addition, the hardware may include dedicated devices for DES encryption.

Software:
Preferably the operating system on the COTS server and/or "bare metal" server is a LINUX OS such as Ubuntu, Redhat, etc.

The COTS Server and/or "bare metal" server and/or virtual machine includes container software.

The COTS Server and/or "bare metal" server and/or virtual machine and/or other server includes at least a part of a container orchestration system.

The COTS Server and/or "bare metal" server and/or virtual machine and/or other server includes a resource allocation manager (RAM) 520 that manages, at least in part, the server allocation of software and/or hardware resources for vCore instances, including for example: CPU Cores, memory, VFs, WAT VFs, MAC addresses, etc. The RAM 520 may also provide server configuration, including OS configuration, driver support, etc., diagnostics and health monitoring. The COTS Server and/or "bare metal" server and/or virtual machine and/or other server may include an orchestration app 540 that manages, at least in part, the management of the vCores (e.g., containers and/or pods).

The COTS Server and/or "bare metal" server and/or virtual machine and/or other server may run the PTP application 522 that synchronizes the system clock of the COTS Server and/or "bare metal" server and/or virtual machine and/or vCore instances 520 based upon a grand master clock for the system as a whole. For increased accuracy, the PTP application 522 is preferably based upon hardware time stamping and a Precise Hardware Clock that is present on the NICs 514.

The container initialization and resource allocation for the containers may be performed in a distributed fashion. An initial vCore initialization 582 may be used to perform, or otherwise cause to be performed, a default configuration of an instantiated vCore. A vCore orchestration 584 may be used to perform, or otherwise cause to be performed, a management of the instantiated vCores together with allocation of resources for particular vCores. In this manner, the initial vCore initialization 582 and the vCore orchestration 584 work together to instantiate vCores, allocate resources to vCores, and manage the resourced instantiated vCores. The initial vCore initialization 582 preferably operates in conjunction with the orchestration app 540 on the server to instantiate the default vCores. The vCore orchestration 584 preferably operates in conjunction with the orchestration app 540 on the server to perform the orchestration of the vCores. The vCore orchestration 584 preferably operates in conjunction with the RAM 520 to allocate recourses for the vCores.

As noted previously, the COTS server that includes vCore instances has allocation of resources that are managed, at least in part, by the RAM 520. During the COTS server startup phase the RAM may create multiple resource pools (CPU Cores, data plane network VFs, encryption VFs, etc.), after which the RAM may assign or lease resources from each pool to vCore PODs upon deployment as requested by the container orchestration system 540. In addition, the RAM 520 may manage data encryption and decryption that may be selectively off loaded to dedicated hardware, as desired.

The RAM 520 may include a REST API that may be used to assign and free up resources, and which may also be used to determine resource availability and allocation status. The RAM 520 may also checkpoint periodically the resource pools status to an in-memory key-value database cache with durability and use that cached data in the event of a COTS server crash. The in-memory key-value database cache is preferably unsuitable for readily random access and is more suitable for reconstruction of the data back into memory in the event that the COTS server crashes.

Figure 6:
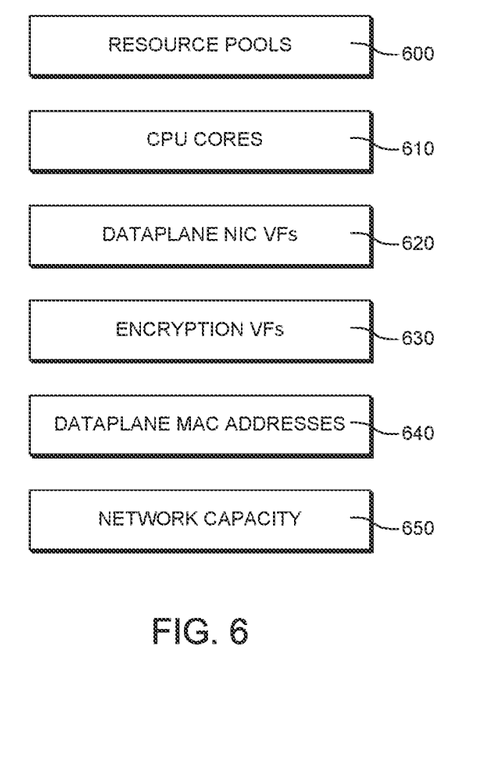
FIG. 6 illustrates resource pools.

Referring also to FIG. 6, the RAM 520 resource pools 600 may include, for example, several hardware and/or software resources that may be allocated.

One resource pool may include CPU Cores 610. From the total number of physical CPU cores available on a server (Tc), the COTS server bootup configuration may assign several operating system scheduled CPU cores (Sc) and a number of isolated CPU cores (Ic), with Sc+Ic=Tc. The Sc CPU cores are used by non-data plane applications (OS, RM, PTP App, Control Plane and Management Plane, etc.), while the Ic CPU Cores are used exclusively by the data plane based software. The RAM may create and manage the CPU Core pool 610 composed of Ic cores, identified by CPU Core Id.

Another resource pool may include data plane NIC VFs 620. Upon startup of the COTS server, with vCore instances, may create the data plane NIC VFs. The number of data plane NIC VFs created should be larger than the projected number of vCore instances that are likely to be deployed on the COTS server. The data plane NIC VF pool 620 may include the PCI addresses, or otherwise, of all the data plane NIC VFs created upon startup.

Another resource pool may include encryption VFs 630. In a manner similar to the data plane NIC VFs 620, upon server startup encryption VFs may be created based upon a dedicated portion of an encryption device available to the vCore instance. The encryption VFs pool 639 may include the PCI addresses, or otherwise, of all the encryption VFs created upon startup.

Another resource pool may include data plane MAC Addresses 640. In many cases, the NIC VFs 534 receive "random" MAC addresses assigned via the operating system Kernel or drivers in the data plane 532. Using "randomized" MAC addresses for vCore instances is not optimal and requires complicated MAC address management. The data plane MAC address pool 640 may use Locally Administered Ranges that are unique for each server for vCore instances.

Another resource pool may include network capacity 650. SR-IOV does not support bandwidth partitioning which results in the PF or the VF on a data plane NIC being capable of using some or all the bandwidth available on that NIC at any given point in time. Providing bandwidth partitioning of the network capacity may be performed as follows. The system may assume a data plane NIC on a particular server with vCore instances has a total bandwidth of Tbw, and each vCore instance deployed on that server requires some capacity calculated based on the above mentioned formula (Cbw=$f_2$ (USsg, DSsg)), then the sum of capacity needed by all vCore instances deployed on the COTS server is less than total available bandwidth (Cbw1+Cbw2+ . . . +CbwN<Tbw). Thus, the Network Capacity "pool" 650 may be the total bandwidth available (Tbw) on a data plane NIC. The RAM 520 may then reserve network capacity for a vCore instance upon request up to Tbw.

Other resource pools may likewise be included, as desired.

A vCore instance configuration is typically composed of at least two parts. The first part may be the RPHY Mac Core configuration. The RPHY Mac Core configuration includes, for example, the DOCSIS, RF, RPD, cable-mac, IP addressing, routing, etc. The second part may be the data plane configuration 532. The data plane configuration 532 and in particular a virtualized data plane for RPHY MAC Core devices configuration includes, for example, CPU Core Ids that are used by the data plane 532, data plane network VF addresses that are used by the data plane 432, MAC addresses for the interfaces, encryption VFs addresses that are used for encryption offload, memory allocation, etc. In many embodiments, the RPHY Mac Core configuration is provided by the multiple system operators prior to actual configuration. The vCore instance of the data plane 532 may be determined based upon the resource information received from the RAM 520 by the vCore instance itself during the initialization phase.

Figure 7A:
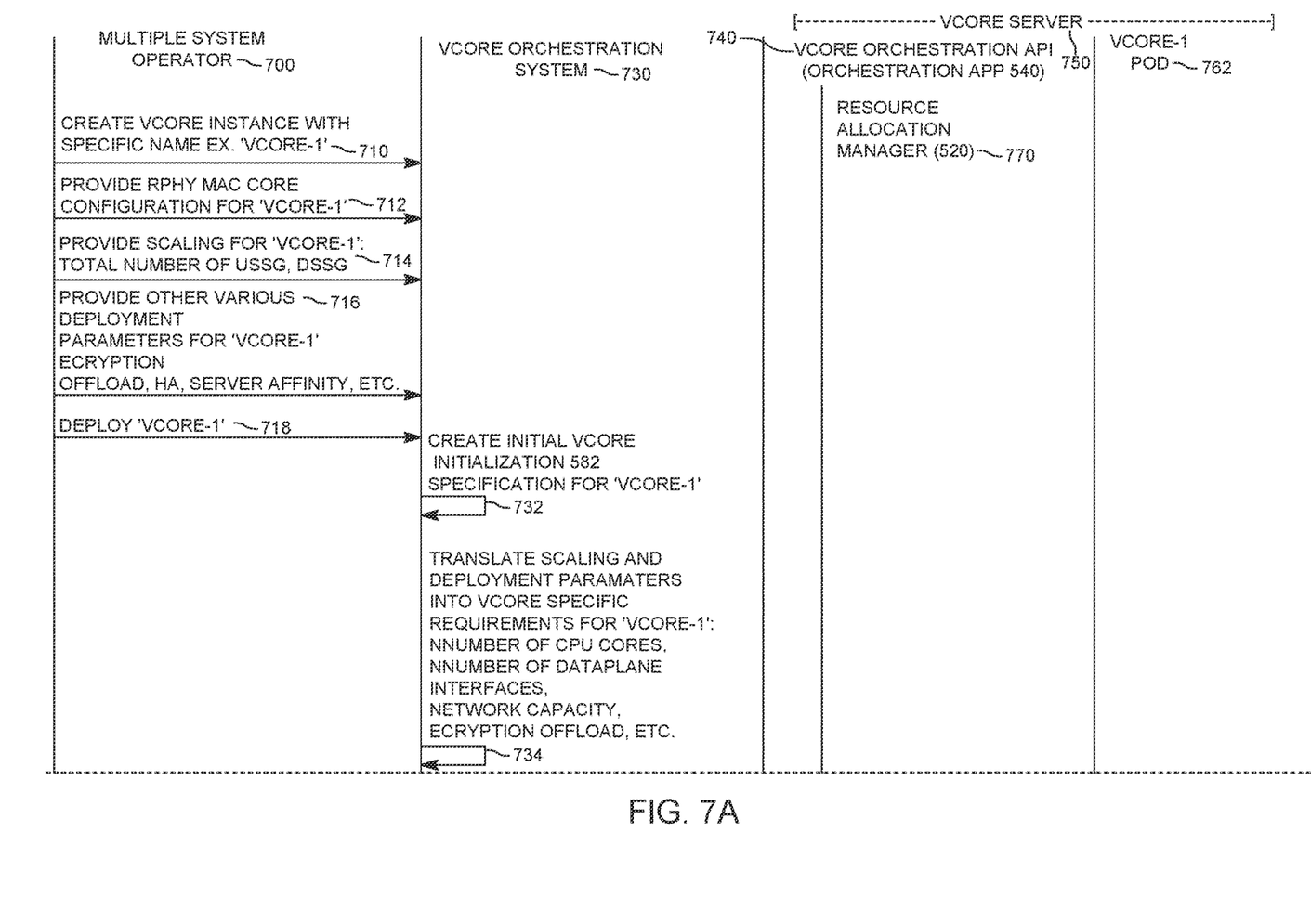
FIGS. 7A-7B illustrates vCore instance initialization.
Figure 7B:
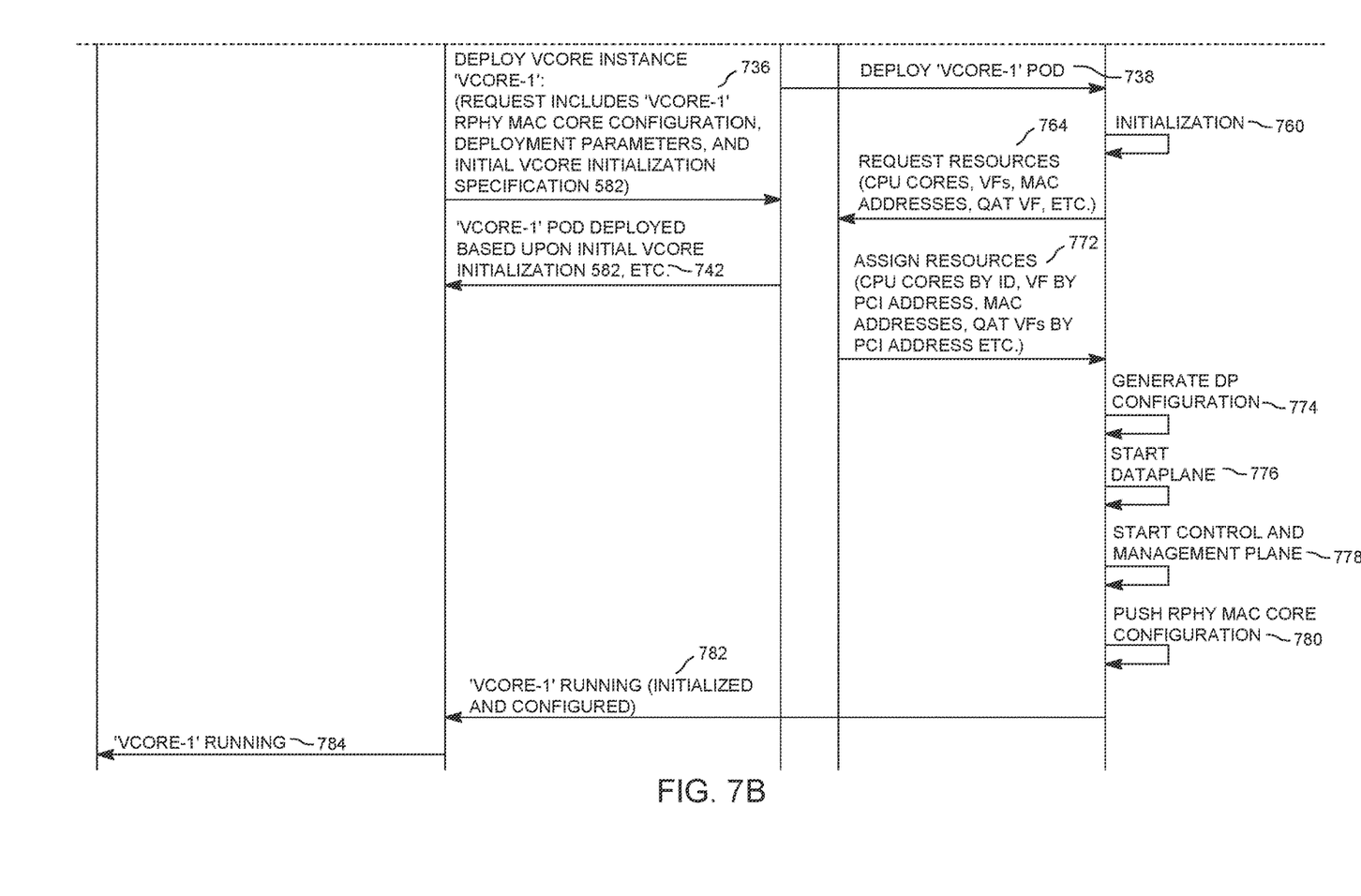

Referring to FIGS. 7A-7B, an exemplary initialization process is illustrated. First, the multiple system operator 700 creates a vCore instance with a specific name 710. The multiple system operator 700 provides RPHY MAC Core configuration 712 for the created vCore instance 710. The multiple system operator 700 provides scaling 714 for the created vCore instance 710. The multiple system operator 700 provides other deployment parameters 716 for the created vCore instance 710. Based upon the provided data the multiple system operator 700 deploys 718 the created vCore instance 710. A vCore orchestration system 730 creates deployment specifications 732 for the created vCore instance 710. The vCore orchestration system 730 translates scaling and deployment parameters into vCore instance specific hardware and/or software allocations 734. The vCore orchestration system 730 deploys 736 the created vCore instance 710 to a vCore orchestration API 740. The vCore orchestration API 740 deploys a pod 738 of created vCore instance(s) 710 based upon the vCore orchestration API 740 on a COTS server and/or "bare metal" server and/or virtual machine 750. The vCore orchestration API 740 provides a notification to the vCore Orchestration System 730 that the pod was deployed 742. The COTS server and/or "bare metal" server and/or virtual machine 750 initializes 760 the pod 738. A pod 762 requests resources 764 from a resources management application 770. The resources management application 770 assigns such resources 722. The pod 762 generates data plane configuration 774, starts the data plane 776 with the configuration 774, starts a control and management plane 778, and pushes RPHY Mac Core configuration 780. The vCore POD 762 replies that the vCore instance is running (e.g., initialized and configured) 782 to the vCore Orchestration System 730. The vCore Orchestration System 730 replies that the vCore is running 784 to the multiple system operator 700.

Moreover, each functional block or various features in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

It will be appreciated that the invention is not restricted to the particular embodiment that has been described, and that variations may be made therein without departing from the scope of the invention as defined in the appended claims, as interpreted in accordance with principles of prevailing law, including the doctrine of equivalents or any other principle that enlarges the enforceable scope of a claim beyond its literal scope. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated. The word "comprise" or a derivative thereof, when used in a claim, is used in a nonexclusive sense that is not intended to exclude the presence of other elements or steps in a claimed structure or method.

The invention claimed is:

1. A cable system comprising:
   (a) a head end connected to a plurality of customer devices through a transmission network that includes a remote fiber node that converts digital data to analog data suitable for said plurality of customer devices, where said head end includes at least one server that includes a processor;
   (b) a container operating on said at least one server where said container includes a data plane application that provides packets of data for transmission to said remote fiber node;
   (c) said data plane application included within said container that is instantiated with at least one of,
   (1) said container operating on said at least one server includes said data plane application that is in communication to provide said packets of data to said remote fiber node using a physical networking device external to said container, said physical networking device including a capability to provide maximum level of bandwidth to said remote fiber node, said container operating on said at least one server includes said data plane application having a virtual networking function configured to provide a first level of bandwidth of said packets of data to said physical networking device which is less than said maximum level of bandwidth, where said physical networking device allocates said first level of bandwidth only to said virtual networking function, said physical networking device does not include the capability of sharing that first level of bandwidth with any other data plane applications of said cable system, where said physical networking device is configured in a manner that when said first level of bandwidth is not being used by said virtual networking function first level of bandwidth is not available to be used by said any other data plane applications, where said first level of bandwidth is with the allocation of said virtual networking function based upon said plurality of customer devices, and
   (2) a computing resource function providing dedicated computing resources of a portion of said at least one server, where one of said at least one server incudes at least one processor each of said at least one processor includes a plurality of cores, where said data plane application is operating on said one of said at least one server using said at least one processor each of said at least one processor includes said plurality of cores, where an operating system is operating on said one of said at least one server using said at least one processor each of said at least one processor includes said plurality of cores, where said operating system is operating on a first processor of said at least one processor where said first processor includes a first plurality of cores, where said data plane application is operating on said first processor of said at least one processor where said first processor includes said first plurality of cores, where a first one of said first plurality of cores is operating said data plane application, said first one of said first plurality of cores is isolated from said operating system which is operating on at least one other core of said first plurality of cores, wherein said cable system is configured in such a manner that only said data plane application is operable on said first one of said first plurality of cores, wherein said cable system is configured in such a manner that only said operating system is not operable on said first one of said first plurality of cores, where an allocation of one or more said cores that are isolated for said data plane application is based upon said plurality of customer devices;
   (d) said data plane application receiving data from a data source and provides said packets of data for transmission to said remote fiber node.

2. The cable system of claim 1 wherein said head end receives packetized video, receives packetized data from a network, and transmits packetized data to said network using said data plane application.

3. The cable system of claim 2 wherein said head end transmits downstream data to selected ones of said plurality of customer devices using said data plane application, transmits downstream video to selected ones of said plurality of customer devices using said data plane application, and receives upstream data from selected ones of said plurality of customer devices using said data plane application.

4. The cable system of claim 1 wherein said transmission network includes a remote PHY that includes at least one of a quadrature amplitude modulator and an orthogonal frequency division modulator.

5. The cable system of claim 1 wherein said dedicated computing resources includes at least one of (a) processor type, (b) number of processing cores per processor, (c) amount of memory for each processor type, (d) amounts of memory per processing core, (e) cryptographic capabilities, (f) amounts of available off-processor memory, (g) memory bandwidth (DDR) speeds, (h) type of network interface, and (i) and type of network capabilities.

6. The cable system of claim 1 wherein said dedicated computing resources includes at least one of (a) software profile, (b) operating system, (c) software service, and (d) framework.

7. The cable system of claim 1 wherein said data plane includes a remote PHY functionality.

8. The cable system of claim 1 wherein said data plane includes a remote MAC functionality.

9. The cable system of claim 1 wherein said data plane includes a remote PHY MAC functionality.

10. The cable system of claim 1 wherein said data plane application included within said container is instantiates said virtual networking function and said computing resource function.

11. The cable system of claim 1 wherein said dedicated computing resources includes selected processing cores.

12. The cable system of claim 1 wherein said dedicated computing resources includes network capacity.

13. The cable system of claim 1 wherein said data plane application operates in user space and does not make use of an operating system kernel of said at least one server.

14. The cable system of claim 1 wherein said dedicated networking functionality includes a guaranteed minimum bandwidth.

15. The cable system of claim 1 further comprising an encryption device separate from said data plane application.

* * * * *